US008180499B2

(12) United States Patent
Kanai

(10) Patent No.: US 8,180,499 B2
(45) Date of Patent: May 15, 2012

(54) POWER SUPPLY SYSTEM

(75) Inventor: Yasushi Kanai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/840,555

(22) Filed: Jul. 21, 2010

(65) Prior Publication Data

US 2011/0035070 A1 Feb. 10, 2011

(30) Foreign Application Priority Data

Aug. 7, 2009 (JP) ................................ 2009-185137

(51) Int. Cl.
*G06F 1/28* (2006.01)

(52) U.S. Cl. ........................................ 700/288; 700/287

(58) Field of Classification Search .................. 700/288
See application file for complete search history.

(56) References Cited

U.S. PATENT DOCUMENTS

| | | | | |
|---|---|---|---|---|
| 7,217,896 | B1 * | 5/2007 | Skarlupka et al. | 200/284 |
| 7,696,642 | B2 * | 4/2010 | Wakitani et al. | 307/65 |
| 2002/0108745 | A1 * | 8/2002 | Kimura | 165/236 |
| 2004/0066094 | A1 * | 4/2004 | Suzuki et al. | 307/18 |
| 2008/0262857 | A1 * | 10/2008 | Perera | 705/1 |

FOREIGN PATENT DOCUMENTS

| | | | |
|---|---|---|---|
| JP | 08186927 | A * | 7/1996 |
| JP | 2003-339118 | A | 11/2003 |

OTHER PUBLICATIONS

Machine Translation of JP 08-186927 A (1996).*

Onovwiana, H.I., Ugursal, V.I. "Residential Cogeneration Systems: Review of the Current Technology". Renewable and Sustainable Energy Reviews 10.5 (2006): abstract, article outline.*

"Cogeneration: Combined Heat and Power Solutions" Cummins Power Generation (2008).*

Bloem, J. "Distributed Generation and Revewables 8.3.1 Integration and Interconnection" Copper Development Association Institution of Engineering and Technology Endorsed Training Provider (2007).*

Hedman, B., Kaarsberg, T. "Distributed Generation: The New Power Paradigm for a New Millenium, Chapter 10: Combined Heat and Power (CHP)". CRC Press (2001).*

Smit, R. "Distributed Generation and Renewables 8.3.5 Cogeneration" Copper Development Association Institution of Engineering and Technology Endorsed Traning Provider (2006).*

* cited by examiner

*Primary Examiner* — Ryan Jarrett

(74) *Attorney, Agent, or Firm* — Carrier Blackman & Associates, P.C.; Joseph P. Carrier; William D. Blackman

(57) ABSTRACT

In a power supply system (10) having a cogeneration unit (12) equipped with an internal combustion engine (12*a*) and a generator (12*b*) to generate power to be supplied to a power destination and hot water to be supplied to a hot water destination, there are provided with a natural energy generation unit (14) that generates power with natural energy, a power supply unit (20) that receives the power generated by the generator and natural energy generation unit to supply the received power to the power destination; a voltage detector (22*a*) that detects voltage (V1) of the power flowing through an connecting bus (22), and an electric heater (121). The power supply unit (20) controls operation of the electric heater based on the detected connecting bus power voltage (V1), thereby effectively utilizing surplus electricity without transmitting back it to a commercial power source.

11 Claims, 4 Drawing Sheets

24 18 18a 18b AC/DC DC/DC 18c CONT 22 10
TO EXTERNAL COMPUTER
16 16a 16b DC/DC 16c V2 CONT 16d 22a V1
20c 20d 20e 20 CONT 20b DC/AC 20a
14 14b DC/DC 14c 14a CONT
TO POWER DESTINATION (LOAD)
12 12a 12b 12c 12a1 E G 12f AC/DC 12g DC/DC 12e 12i 12h 12m CONT 12n 12j1 12d 12k1 12k 12j 12l
FROM WATER SUPPLY SOURCE
TO HOT WATER DESTINATION(LOAD)

POWER SUPPLY SYSTEM

BACKGROUND OF THE INVENTION

1. Field of the Invention

This invention relates to a power supply system, particularly to a distributed power supply system installed at an individual residence to cover power demand of the residence.

2. Description of the Related Art

A distributed power supply system, i.e., a power supply system of distributed generation (also called on-site generation) is installed near a place where electric power is needed to generate and supply power thereto. Since the supplied power is consumed at the same location as the place it is generated, the system is superior because the power transmission loss can be suppressed. Such a distributed power supply is taught by, for example, by Japanese Laid-Open Patent Application No. 2003-339118.

In the system disclosed in the reference, a DC bus is connected to a wind-power generation unit and photovoltaic generation unit (power generation unit) and to a load (power destination) to supply power generated by the power generation unit to the load, while connected to a commercial power source via a parallel unit so that, when the voltage of the DC bus is decreased upon increase of power demand, power is supplied from the commercial power source.

The system is also connected to a power storage unit and when the generated power exceeds the power demand and the voltage of the DC bus is increased, stores surplus electricity in the storage unit. When the voltage of the DC bus is further increased, the system transmits the surplus electricity back to the commercial power source to sell. Thus, it is configured to efficiently utilize the surplus electricity.

SUMMARY OF THE INVENTION

However, since the system in the reference transmits the surplus electricity back to the commercial power source, it causes the power transmission loss and there is still room for improvement.

An object of this invention is therefore to overcome the foregoing problem by providing a power supply system that can effectively utilize surplus electricity without transmitting back the surplus electricity to the commercial power source.

In order to achieve the object, this invention provides a power supply system having a cogeneration unit equipped with an internal combustion engine and a generator driven by the engine to generate power to be supplied to a power destination and hot water to be supplied to a hot water destination by heat exhausted from the engine, comprising: a natural energy generation unit that generates power with natural energy; a power supply unit that receives the power generated by the generator and the natural energy generation unit to supply the received power to the power destination; a connecting bus that electrically connects the cogeneration unit, the natural energy generation unit and the power supply unit; a voltage detector that detects voltage of the power flowing through the connecting bus; and an electric heater that heats the hot water by the power supplied through the connecting bus, wherein the power supply unit controls operation of the electric heater based on the detected connecting bus power voltage.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

A power supply system according to an embodiment of the invention will now be explained with reference to the attached drawings.

Figure 1:
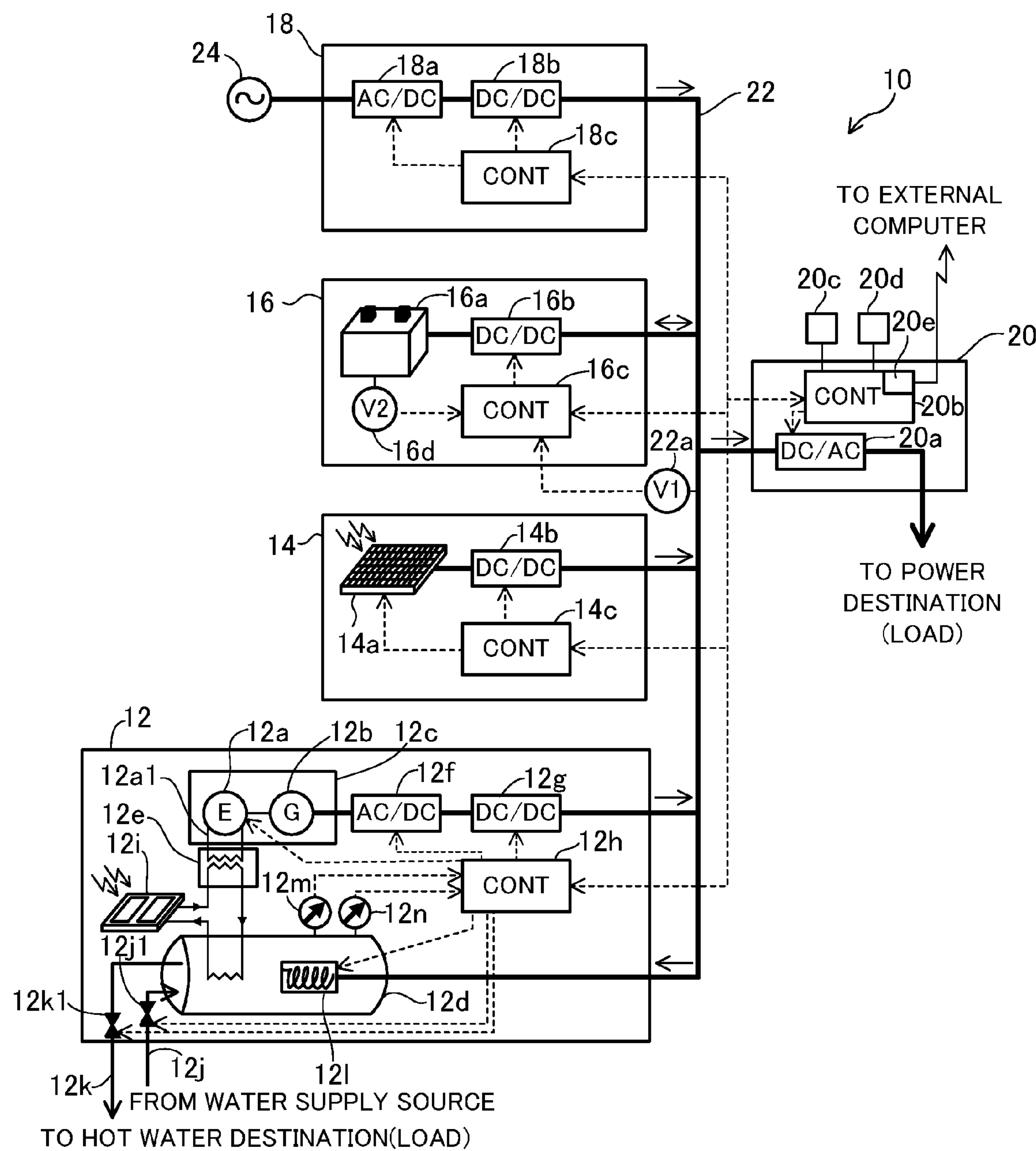
FIG. 1 is a schematic view giving an overall view of a power supply system according to an embodiment of this invention.

FIG. 1 is a schematic view giving an overall view of a power supply system according to an embodiment of this invention. In the drawing, thick solid lines indicate flow of electric power, broken lines signal lines, and thin solid lines flow of liquid such as (hot) water to be supplied and heating medium.

In FIG. 1, reference numeral 10 designates the power supply system. The power supply system 10 comprises a cogeneration unit 12, natural energy generation unit 14, storage unit 16, commercial power unit 18 and power supply unit 20 and also a DC power bus 22 for connecting the foregoing units. The system 10 is a distributed power supply system installed near a place where power is needed, e.g., an individual residence like house.

The cogeneration unit 12 is equipped with a main body **12*c* having an internal combustion engine (denoted "E" in FIG. 1) 12*a* and AC generator ("G") 12*b* driven by the engine 12*a*, a hot water tank 12*d*, an exhaust heater (heat exchanger) 12*e* for heating water in the tank 12*d* by using exhaust heat exhausted from the engine 12*a*, an AC/DC converter ("AC/DC") 12*f*, a DC/DC converter ("DC/DC") 12*g*, and a controller ("CONT") 12*h* for controlling the operation of these devices. The engine 12*a*** is a single-cylinder, four-cycle, water-cooled, spark-ignition, OHV engine that runs on city gas or LP (liquefied petroleum) gas and has a displacement of, for example, 163 cc.

The AC power generated by the AC generator **12*b* is converted to the DC power by the AC/DC converter 12*f* and boosted or stepped up to a predetermined voltage (e.g., 750V) by the DC/DC converter 12*g*. The boosted DC power is sent to the DC power bus 22**.

The exhaust heat of the engine **12*a* is forwarded through a coolant passage 12*a*1 of the engine 12*a* to the exhaust heater 12*e*, where it is heat-exchanged with heating medium flowed therein. The heating medium heated through the heat exchange is sent to the tank 12*d*** to heat water therein (to generate hot water).

The cogeneration unit 12 is further equipped with a solar heater **12*i* that heats the heating medium. The solar heater 12*i* has a case of flat box shape which is, for instance, 2 meters wide, 1 meter long and 0.1 meter high and is attached on its top surface with a glass plate. The solar heater 12*i*** is installed outside at a sunny location such as rooftop of the residence and heats the heating medium filled in the case by solar heat. Ethylene glycol solution is used as the heating medium.

The tank **12*d* is connected to a water supply pipe 12*j* for leading water from a water supply source and a hot water supply pipe 12*k* for supplying heated hot water to a hot water destination (load). The water supply pipe 12*j* is provided with a feed-water valve (open/close valve) 12*j*1 and when it is opened, water is supplied from the water supply source to the tank 12***d*. The hot water supply pipe 12*k* is similarly provided with a feed-hot-water valve (open/close valve) 12*k*1 and when it is opened, hot water is supplied to the hot water destination.

The tank 12*d* is further installed with an electric heater 12*l* having an electric heating wire. The electric heater 12*l* is connected to the DC power bus 22 to be operated with power supplied therethrough to further heat the water which has been heated through heat exchange.

A thermometer 12*m* and water gauge 12*n* are installed at the tank 12*d* and produce outputs indicative of the temperature and quantity of water stored in the tank 12*d*, respectively. The outputs of the thermometer 12*m* and water gauge 12*n* are sent to the controller 12*h*.

The controller 12*h* which has a microcomputer including a CPU, ROM, memory, input/output circuits and other devices monitors the operation of the AC/DC converter 12*f* and DC/DC converter 12*g* and when overvoltage or overcurrent is detected, disconnects the power transmission to the DC power bus 22. The controller 12*h* controls the operation of the engine 12*a* and valves 12*j*1, 12*k*1 based on operation setting data (explained later) and inputted outputs, and controls the operation of the electric heater 12*l* in association with a controller (explained later) of the power supply unit 20.

The natural energy generation unit 14 is equipped with a photovoltaic generator 14*a* installed outside at a sunny location such as rooftop of the residence for generating power through sunlight, a DC/DC converter 14*b* and a controller 14*c* for controlling the operation of these devices. The generator 14*a* is also installed outside at a sunny location such as rooftop of the residence.

The DC power generated by the photovoltaic generator 14*a* is boosted or stepped up to a predetermined voltage (e.g., 750V) by the DC/DC converter 14*b* and the boosted DC power is sent to the DC power bus 22. The controller 14*c* monitors the operation of the photovoltaic generator 14*a* and DC/DC converter 14*b* and when overvoltage or overcurrent is detected, disconnects the power transmission to the DC power bus 22.

The storage unit 16 is equipped with a chargeable/dischargeable battery (e.g., a lead-acid battery) 16*a*, a DC/DC converter 16*b* and a controller 16*c* for controlling the operation of these devices. The battery 16*a* is connected to the DC power bus 22 through the DC/DC converter 16*b*. When the battery 16*a* is discharged, the discharged power is boosted or stepped up to a predetermined voltage (e.g., 750V) by the DC/DC converter 16*b* and sent to the DC power bus 22. When the battery 16*a* is charged, the power from the DC power bus 22 is stepped down by the DC/DC converter 16*b* and transmitted to the battery 16*a*.

The controller 16*c* is connected to a voltage sensor (denoted "V1" in FIG. 1) 22*a* installed at the DC power bus 22 and produces an output indicative of voltage V1 of power flowing through the bus 22. The output is sent to the controller 16*c* and based on the output, the controller 16*c* determines whether the battery 16*a* is charged or discharged and sends a charge/discharge switch command (or a no charge/discharge command) to the DC/DC converter 16*b*. Specifically, the controller 16*c* sends the charge/discharge switch command to the DC/DC converter 16*b* in association with the controller (explained later) of the power supply unit 20. A voltage sensor (denoted "V2") 16*d* is installed at the battery 16*a* and produces an output indicative of voltage V2 of power stored therein. The output is also sent to the controller 16*c*.

The commercial power unit 18 is equipped with an AC/DC converter 18*a*, a DC/DC converter 18*b* and a controller 18*c* for controlling the operation of these devices. The AC/DC converter 18*a* is connected to a commercial power source 24 to convert the AC power supplied therefrom to the DC power. The converted DC power is boosted or stepped up to a predetermined voltage (e.g., 750V) by the DC/DC converter 18*b* and the boosted DC power is sent to the DC power bus 22. The controller 18*c* monitors the operation of the AC/DC converter 18*a* and DC/DC converter 18*b* and when overvoltage or overcurrent is detected, disconnects the power transmission to the DC power bus 22. Further, the controller 18*c* sends a command for transmitting power to the DC power bus 22 (power transmission command) to the DC/DC converter 18*b* in association with the controller (explained later) of the power supply unit 20. Unless the power transmission command is issued, the commercial power is not transmitted to the DC power bus 22.

The power supply unit 20 is equipped with a DC/AC converter (denoted "DC/AC" in FIG. 1) 20*a* and a controller 20*b* for controlling the operation thereof. The DC/AC converter 20*a* is connected to the DC power bus 22 to be supplied with the DC power from the foregoing units. The supplied DC power is converted to the AC power by the DC/AC converter 20*a* to be supplied to a power destination (load where power is needed) in the individual residence. The controller 20*b* monitors the operation of the DC/AC converter 20*a* and when overvoltage or overcurrent is detected, disconnects the power transmission to the power destination.

The controller 20*b* is connected to a data input device 20*c* that inputs the operation setting data of the power supply system 10 and a display 20*d* that displays the data and operating condition of the system 10. The operation setting data includes various predetermined voltages (explained later), hot water supply start time of the cogeneration unit 12 and thermal demand (amount and temperature of hot water). The controller 20*b* is also provided with a communication device 20*e* capable of transmitting/receiving data to/from an external computer.

The controller 20*b* is connected to the controllers 12*h*, 14*c*, 16*c*, 18*c* of the foregoing units to be able to communicate and based on the operation setting data and the outputs sent from the units, sends commands to the units to control the units collectively. In particular, based on the outputs indicative of voltages V1, V2 sent from the storage unit 16, the controller 20*b* controls the operation of the electric heater 12*l*, charge/discharge of the storage unit 16, and power transmission of the commercial power unit 18.

Like the controller 12*h*, other controllers 14*c*, 16*c*, 18*c* and 20*b* are each provided with a CPU, ROM, memory, input/output circuits and other devices.

Figure 2:
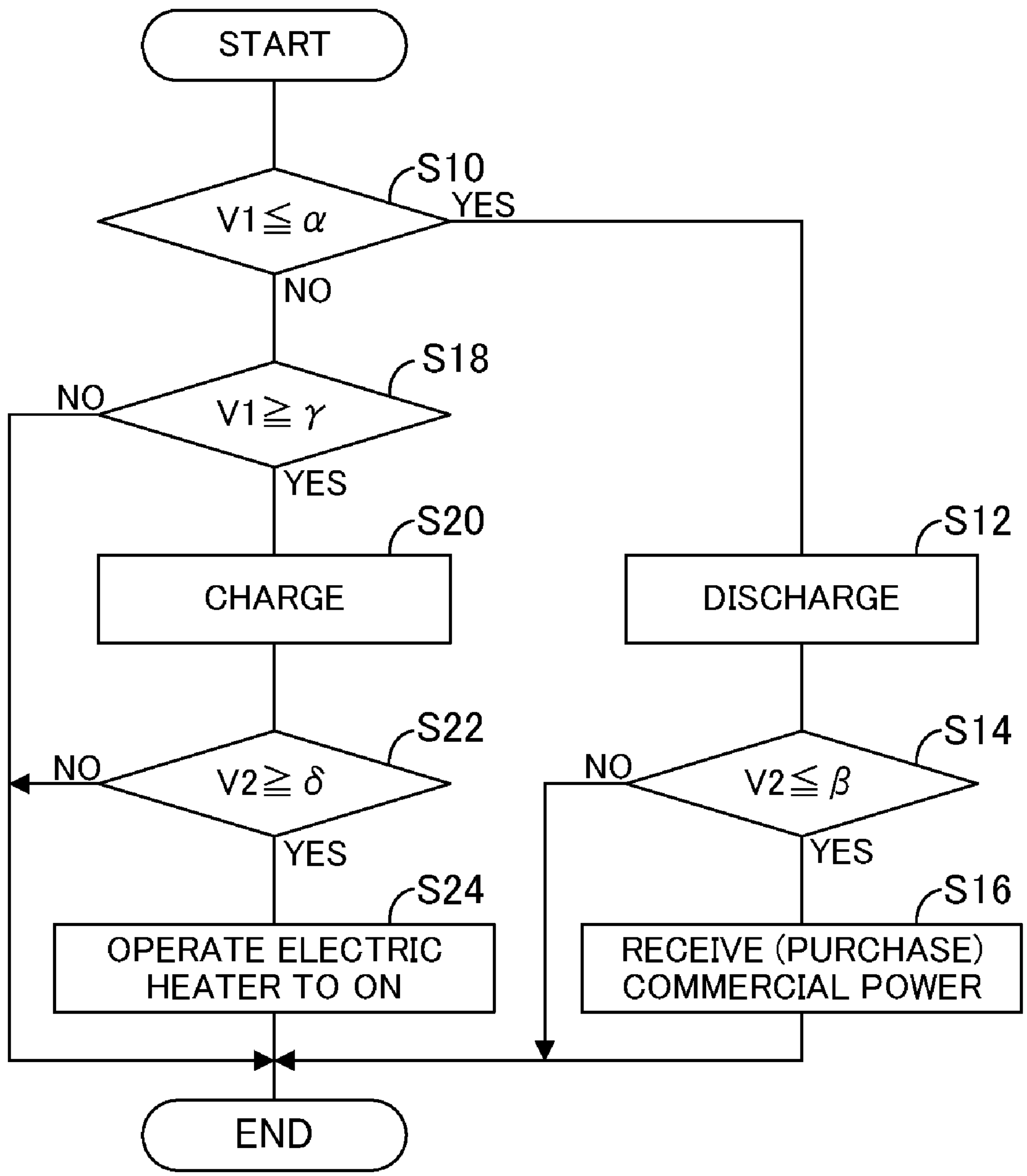
FIG. 2 is a flowchart showing the operation of the system shown in FIG. 1.

FIG. 2 is a flowchart showing the operation of the system 10. The illustrated program is executed by the controller 20*b* when the system 10 is powered ON (activated).

The program begins at S10, in which it is determined whether the voltage V1 of the DC power bus 22 is equal to or less than a predetermined voltage a (e.g., 700 V). The voltage V1 is decreased when an amount of power consumed at the power destination exceeds that generated by the AC generator 12*b* and photovoltaic generator 14*a*. Therefore, when the result in S10 is affirmative, the program proceeds to S12, in which the storage unit 16 is controlled to discharge. Specifically, since the generated power is insufficient for the power demand, the voltage V1 is increased.

The program then proceeds to S14, in which it is determined whether the voltage V2 of the battery 16*a* is equal to or less than a predetermined voltage 13 (e.g., 10 V). Since the voltage V2 is decreased with decreasing amount of stored power, when the result in S14 is affirmative, the program proceeds to S16, in which the commercial power unit 18 is controlled to transmit power, i.e., a command is issued so that power from the commercial power source 24 is purchased and transmitted to the DC power bus 22. When the result in S14 is negative, since the stored power amount in the battery 16*a* is sufficient, the step of S16 is skipped and the program is terminated.

When the result in S10 is negative, the program then proceeds to S18, in which it is determined whether the voltage V1 of the DC power bus 22 is equal to or greater than a predetermined voltage γ (e.g., 750 V). The voltage V1 is increased when the amount of power generated by the AC generator 12*b* and photovoltaic generator 14*a* exceeds that consumed at the power destination. Therefore, when the result in S18 is affirmative, the program proceeds to S20, in which the storage unit 16 is controlled to charge. Specifically, the surplus electricity is stored to decrease the voltage V1.

The program then proceeds to S22, in which it is determined whether the voltage V2 of the battery 16*a* is equal to or greater than a predetermined voltage δ (e.g., 15 V). Since the voltage V2 is increased with increasing amount of stored power, when the result in S22 is affirmative, it is determined that the battery 16*a* is fully charged and the program proceeds to S24, in which a command is sent to the cogeneration unit 12 to operate the electric heater 12*l* to on.

Specifically, when the both voltages V1, V2 are equal to or greater than the predetermined voltages γ, δ, the surplus electricity resulted from power generation of the AC generator 12*b* and photovoltaic generator 14*a* is converted to heat through the electric heater 12*l* to heat water in the tank 12*d*.

When the result in S22 is negative, since it means that the battery 16*a* is not fully charged and still able to store the surplus electricity, the step of S24 is skipped and the program is terminated.

When the result in S18 is negative, since the power consumed at the power destination and the power generated by the AC generator 12*b* and photovoltaic generator 14*a* are balanced, it is determined that charge/discharge of the battery 16*a* is not necessary and the program is terminated.

The explanation on the amounts of power and heat generated by the power supply system 10 will be made separately for the cases of a bad weather day and good weather day.

FIG. 3 is a set of explanatory views for explaining the amounts of power and heat generated by the system 10 on a bad weather day.

Figure 3A:
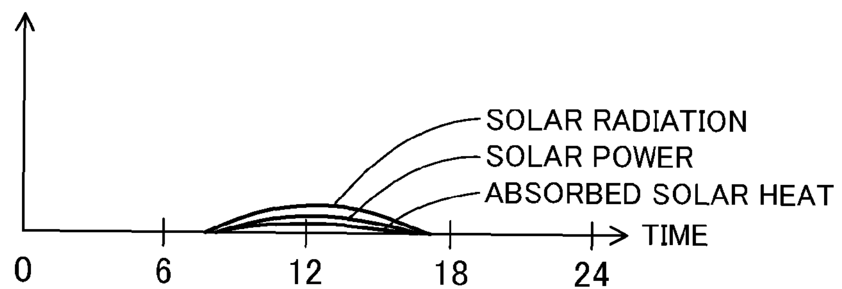
FIG. 3 is a set of explanatory views for explaining amounts of power and heat generated by the system shown in FIG. 1 on a bad weather day.
Figure 3B:
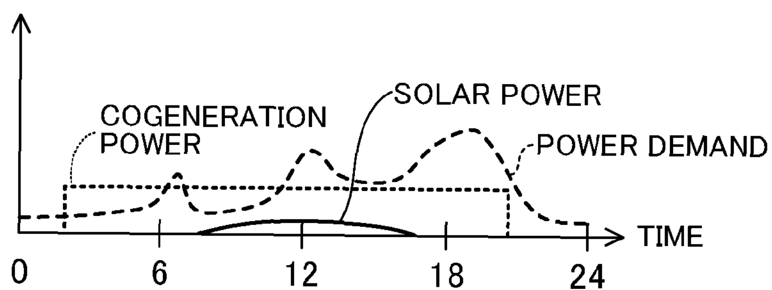

FIG. 3A is a graph showing amounts of solar radiation, solar power generated by the photovoltaic generator 14*a* and heat (absorbed solar heat) absorbed by the solar heater 12*i*. FIG. 3B is a graph showing amounts of power (cogeneration power) generated by the AC generator 12*b* of the cogeneration unit 12, solar power and power consumed at the power destination (power demand).

Figure 3C:
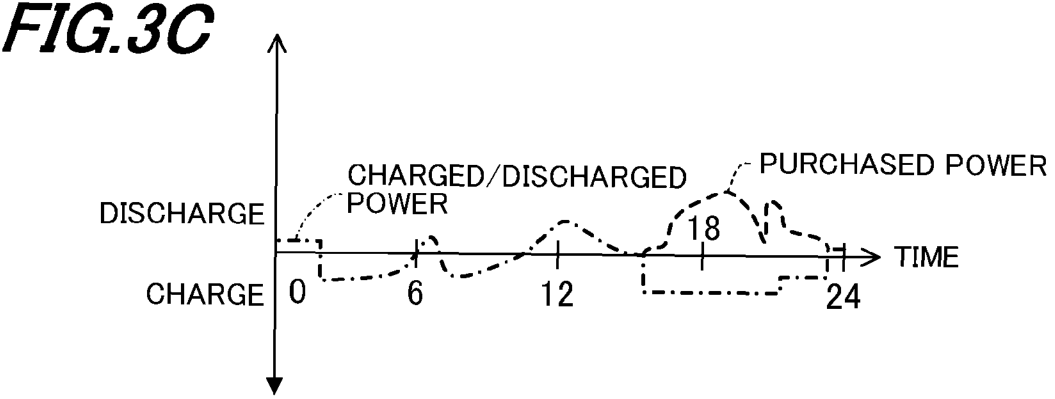
Figure 3D:
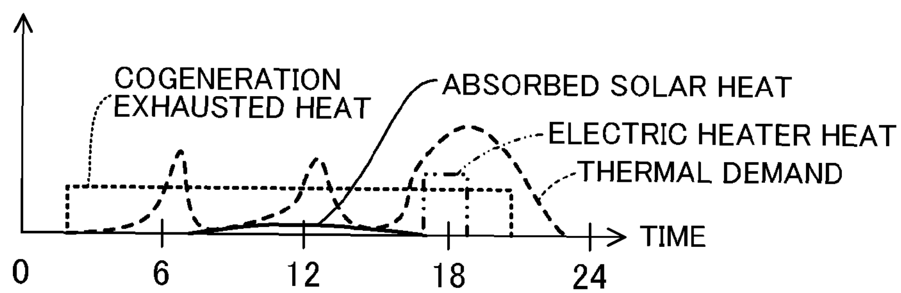
Figure 4A:
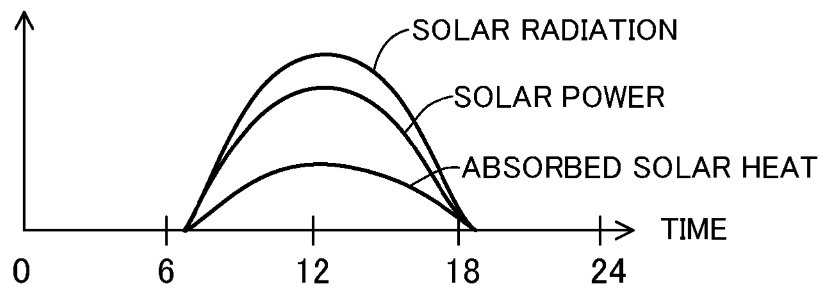
FIG. 4 is a set of explanatory views for explaining the amounts of power and heat generated by the system shown in FIG. 1 on a good weather day.
Figure 4B:
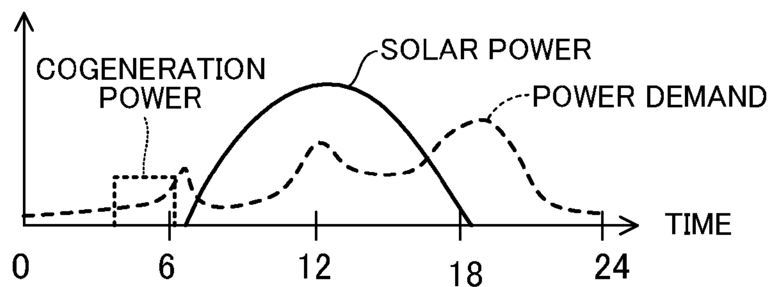
Figure 4C:
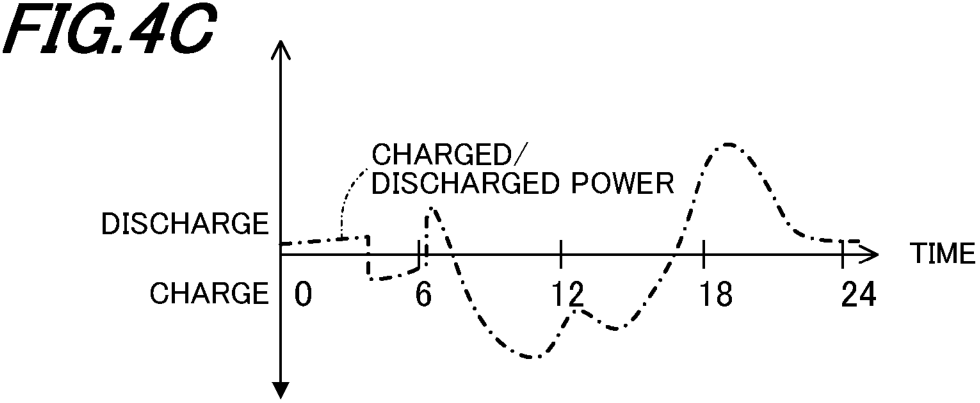
Figure 4D:
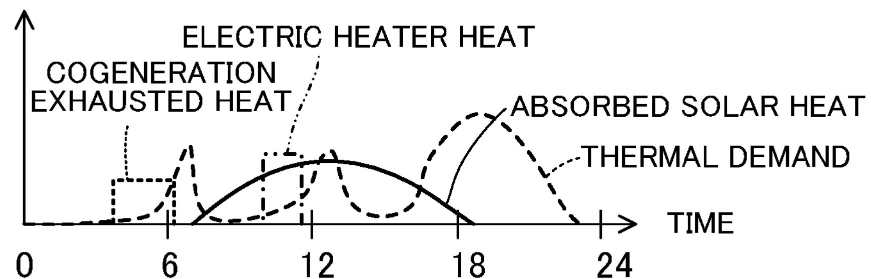

FIG. 3C is a graph showing amounts of charged/discharged power of the battery 16*a* and transmitted power (purchased power) from the commercial power unit 18. FIG. 3D is a graph showing amounts of exhausted heat (cogeneration exhausted heat) from the engine 12*a* of the cogeneration unit 12, absorbed solar heat, heat (electric heater heat) generated by the electric heater 12*l* and heat corresponding to hot water demand (thermal demand).

As illustrated, on a bad weather day, since the power generation by the photovoltaic generator 14*a* and the heat absorption by the solar heater 12*i* can not be expected, the cogeneration unit 12 is to be operated for a long period of time. The operating time of the cogeneration unit 12 is calculated from a heat amount stored in the tank 12*d* (which is estimated based on the outputs of the thermometer 12*m* and water gauge 12*n*), a heat amount required on that day (which is estimated based on the operation setting data) and an absorbed heat amount expected for the solar heater 12*i* (which is estimated based on solar radiation data with respect to different weathers prepared beforehand).

Upon start of the operation of the cogeneration unit 12, the voltage V1 of the DC power bus 22 is increased to exceed the predetermined voltage γ and it makes the battery 16*a* in discharged condition to be in charged condition temporarily. Then, when the power demand is increased so that the voltage V1 is decreased to or below the predetermined voltage α, it makes the battery 16*a* discharged.

After that, when the power demand is further increased, the voltage V2 of the battery 16*a* is decreased to or below the predetermined voltage β and power is purchased from the commercial power source 24. The battery 16*a* is in the charged condition during power purchase.

When the cogeneration exhausted heat and absorbed solar heat can not meet the thermal demand, power is supplied from the DC power bus 22 to operate the electric heater 12*l*.

FIG. 4 is a set of explanatory views similar to FIG. 3 for explaining the amounts of power and heat generated by the system 10 on a good weather day.

On a good weather day, since the power generation by the photovoltaic generator 14*a* and the heat absorption by the solar heater 12*i* can be expected, the cogeneration unit 12 is operated only for a short period of time.

Specifically, although the cogeneration unit 12 is started in the morning for supplying hot water, it is stopped after a short while. Even though the cogeneration unit 12 is stopped, since the amount of solar power is greater than the power demand, the voltage V1 becomes the predetermined voltage γ or more and it makes the battery 16*a* to be in the charged condition.

When, subsequently, the voltage V2 of the battery 16*a* becomes the predetermined voltage δ or more and the battery 16*a* is fully charged, the electric heater 12*l* is operated so that the surplus electricity is converted to heat and stored in the tank 12*d*. As a result, even when the thermal demand is increased later, it is not necessary to operate the cogeneration unit 12. Specifically, power generated by the photovoltaic generator 14*a* can be efficiently used to the utmost extent, without loss.

As stated above, the embodiment is configured to have a power supply system (10) having a cogeneration unit (12) equipped with an internal combustion engine (12*a*) and a generator (AC generator 12*b*) driven by the engine to generate power to be supplied to a power destination (load) and hot water to be supplied to a hot water destination (load) by heat exhausted from the engine, characterized by: a natural energy generation unit (14) that generates power with natural energy; a power supply unit (20) that receives the power generated by the generator (12*b*) and the natural energy generation unit (14) to supply the received power to the power destination; a connecting bus (DC power bus 22) that electrically connects the cogeneration unit, the natural energy generation unit and the power supply unit; a voltage detector (voltage sensor 22*a*) that detects voltage (V1) of the power flowing through the connecting bus; and an electric heater (12*l*) that heats the hot water by the power supplied through the connecting bus, wherein the power supply unit (20) controls operation of the electric heater based on the detected connecting bus power voltage (S10-S24).

In other words, it is configured so that, based on the detected voltage (V1) of the connecting bus (DC power bus 22), it is determined whether or not the surplus electricity is generated and when the surplus electricity is generated, the electric heater (12*l*) is operated to on to convert the surplus electricity to heat for increasing the temperature of water to be supplied. With this, it becomes possible to suppress the power transmission loss of the surplus electricity and utilize the surplus electricity more effectively than transmitting it back to the commercial power source 24.

Further, since the surplus electricity is used to heat water to be supplied, it becomes possible to shorten the operating time of the cogeneration unit (12), thereby enabling to utilize the natural energy to the utmost extent, without loss.

The system further includes: a storage unit (16) that is connected to the connecting bus and stores the power not supplied to the power destination; and the power supply unit (20) controls operation of the storage unit based on the detected connecting bus power voltage (S10-S20).

Specifically, in the system, the power supply unit (20) controls the operation of the storage unit to discharge the stored power when the detected connecting bus power voltage (V1) is equal to or less than a predetermined voltage (a). More specifically, the system further includes: a storage unit (16) that is connected to the connecting bus and stores the power not supplied to the power destination; and a detector (16*d*) that detects voltage (V2) of the power stored in the storage unit, and the power supply unit (20) controls the operation of the electric heater (12*l*) based on the detected stored power voltage (S10-S24).

Still more specifically, in the system, the power supply unit (20) controls the operation of the electric heater (12*l*) to on when the detected connecting bus power voltage (V1) exceeds a predetermined first voltage ($\alpha$) and the detected stored power voltage (V2) exceeds a predetermined second voltage ($\beta$) (S10-S24).

Yet still more specifically, in the system, the power supply unit (20) controls the operation of the electric heater (121) to on when the detected connecting bus power voltage (V1) exceeds a predetermined first voltage ($\alpha$), but is equal to or greater than a predetermined third voltage ($\gamma$), and the detected stored power voltage (V2) exceeds a predetermined fourth voltage ($\delta$) (S10-S24).

Thus, since it is configured so that, based on the stored power voltage (V2) of the storage unit (16), it is determined whether the surplus electricity is generated, the surplus electricity generation can be appropriately determined and hence, it becomes possible to effectively utilize the surplus electricity through the electric heater (12*l*).

In the system, the connecting bus (22) is connected to a commercial power source (24) and the power supply unit (20) determines whether or not to receive power from the commercial power source based on the detected connecting bus voltage (V1) and the detected stored power voltage (V2) (S10-S16). More specifically, the power supply unit (20) determines to receive the power form the commercial power source when the detected connecting bus power voltage (V1) is equal to or less than a predetermined first voltage ($\alpha$) and the detected stored power voltage (V2) is equal to or less than a predetermined second voltage ($\beta$).

Since it is configured to use power from the commercial power source (24) when the increase of power demand is determined based on the detected voltages (V1, V2) of the connecting bus (22) and storage unit (16), it becomes possible to surely supply power to the power destination even in the case that the power demand is increased.

In the system, the natural energy generation unit (14) comprises a photovoltaic generator (14*a*). With this, since it is configured to generate power through sunlight, it becomes possible to achieve high energy efficiency compared to power generation using other kinds of natural energy.

In the system, the cogeneration unit (12) has a solar heater (12*i*) that heats the water with solar heat. With this, it becomes possible to heat water to be supplied further using natural energy.

It should be noted that, in the foregoing embodiment, although the natural energy generation unit 14 is configured to be constituted as the photovoltaic generator 14*a*, it may instead be an aerogenerator or a geothermal generator. Alternatively, a plurality of number of the natural energy generation units may be connected to the DC power bus 22.

It should also be noted that, although the battery 16*a* is to be in the charged condition during power purchase, in order to keep cost low on power purchase, it is not necessarily to be in the charged condition.

It should further be noted that, instead of the Ethylene glycol solution, other liquid or gas may be applied as the heating medium.

Japanese Patent Application No. 2009-185137 filed on Aug. 7, 2009, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. A power supply system, comprising:

a cogeneration unit equipped with;

an internal combustion engine, a generator driven by the engine to generate power to be supplied to a power destination, a hot water tank for supplying hot water to a hot water destination by selectively using heat exhausted from the engine and an electric heater to heat the hot water, and a cogeneration unit (CU) controller for controlling the operation of the cogeneration unit;

a natural energy generation unit that generates power with natural energy;

a power supply unit, including a power supply unit (PSU) controller, that receives the power generated by the generator and the natural energy generation unit to supply the received power to the power destination;

a connecting bus that electrically connects the cogeneration unit, the natural energy generation unit and the power supply unit;

a voltage detector that detects voltage of the power flowing through the connecting bus;

wherein the power supply unit controller controls operation of the electric heater based on the detected connecting bus power voltage.

2. The system according to claim 1, further including:

a storage unit that is connected to the connecting bus and stores the power not supplied to the power destination;

and the power supply unit controller controls operation of the storage unit based on the detected connecting bus power voltage.

3. The system according to claim 2, wherein the power supply unit controller controls the operation of the storage unit to discharge the stored power when the detected connecting bus power voltage is equal to or less than a predetermined voltage.

4. The system according to claim 1, further including:
a storage unit that is connected to the connecting bus and stores the power not supplied to the power destination; and
a detector that detects voltage of the power stored in the storage unit,
and the power supply unit controller controls the operation of the electric heater based on the detected stored power voltage.

5. The system according to claim 4, wherein the power supply unit controller controls the operation of the electric heater to on when the detected connecting bus power voltage exceeds a predetermined first voltage and the detected stored power voltage exceeds a predetermined second voltage.

6. The system according to claim 5, wherein the power supply unit controller controls the operation of the electric heater to on when the detected connecting bus power voltage exceeds the predetermined first voltage, but is equal to or greater than a predetermined third voltage, and the detected stored power voltage exceeds the predetermined second voltage.

7. The system according to claim 4, wherein the connecting bus is connected to a commercial power source and the power supply unit controller determines whether or not to receive power from the commercial power source based on the detected connecting bus voltage and the detected stored power voltage.

8. The system according to claim 7, wherein the power supply unit controller determines to receive the power from the commercial power source when the detected connecting bus power voltage is equal to or less than a predetermined first voltage and the detected stored power voltage is equal to or less than a predetermined second voltage.

9. The system according to claim 1, wherein the natural energy generation unit comprises a photovoltaic generator.

10. The system according to claim 1, wherein the cogeneration unit has a solar heater that heats the water with solar heat.

11. The system according to claim 1, wherein the PSU controller is communicatively coupled with the CU controller and interfaces with the CU controller to control the operation of the electric heater.

* * * * *